(12) United States Patent
Miyagawa

(10) Patent No.: US 8,020,524 B2
(45) Date of Patent: Sep. 20, 2011

(54) EXHAUST HEAT RECOVERY APPARATUS

(75) Inventor: Masashi Miyagawa, Ichinomiya (JP)

(73) Assignee: Denso Corporation, Kariya (JP)

( * ) Notice: Subject to any disclaimer, the term of this patent is extended or adjusted under 35 U.S.C. 154(b) by 627 days.

(21) Appl. No.: 12/218,996

(22) Filed: Jul. 18, 2008

(65) Prior Publication Data

US 2009/0020260 A1     Jan. 22, 2009

(30) Foreign Application Priority Data

Jul. 20, 2007   (JP) .................................. 2007-190117

(51) Int. Cl.
  *F01P 11/08*   (2006.01)
(52) U.S. Cl. ......................... 123/41.33; 165/81; 165/151
(58) Field of Classification Search ............... 123/41.31, 123/41.33; 165/41, 181, 185, 104.14, 104.21, 165/166, 81, 152
See application file for complete search history.

(56) References Cited

U.S. PATENT DOCUMENTS

| 2007/0137851 A1 | 6/2007 | Hamada et al. |
| 2007/0235164 A1 | 10/2007 | Miyagawa et al. |

FOREIGN PATENT DOCUMENTS

| CN | 1987062 | 6/2007 |
| JP | 63-154312 | 10/1988 |
| JP | 4-063965 | 6/1992 |
| JP | 4-063972 | 6/1992 |
| JP | 07-120178 | 5/1995 |
| JP | 10-148481 | 6/1998 |
| JP | 2000-130968 | 5/2000 |
| JP | 2000-161873 | 6/2000 |
| JP | 2001-012241 | 1/2001 |
| JP | 2003-287382 | 10/2003 |
| JP | 2007-278623 | 10/2007 |

OTHER PUBLICATIONS

Office action dated May 26, 2009 in corresponding Japanese Application No. 2007-190117.
Office action dated Sep. 25, 2009 in corresponding Chinese Application No. 2008 10133694.0.

*Primary Examiner* — Noah Kamen
(74) *Attorney, Agent, or Firm* — Harness, Dickey & Pierce, PLC

(57) ABSTRACT

An exhaust heat recovery apparatus includes an evaporator and a condenser. The evaporator and the condenser form an operation medium circuit such that an operation medium circulates through the evaporator and the condenser. The evaporator has tubes and is disposed in a duct part through which an exhaust gas generated from an engine flows. The condenser is disposed in a heated fluid circuit through which a heated fluid flows for heating the heated fluid by condensation of the operation medium. The heated fluid circuit is separate from an engine coolant circuit through which an engine coolant for cooling the engine flows. The evaporator further has a fin between the tubes. The fin is provided with an operation force reducing portion that is capable of reducing an operation force applied to the fin due to a thermal expansion difference between the tubes, which are exposed to the exhaust gas.

16 Claims, 6 Drawing Sheets ately to flow. The heated fluid circuit allows a heated fluid to be heated by heat of the exhaust gas to flow. The evaporator includes a plurality of tubes through which an operation medium flows. The evaporator is disposed in the duct part. The evaporator evaporates the operation medium by the heat of the exhaust gas. The condenser defines an operation medium circuit through which the operation medium flows, with the evaporator such that the operation medium circulates through the evaporator and the condenser. The condenser is disposed in the heated fluid circuit. The condenser condenses
EXHAUST HEAT RECOVERY APPARATUS

CROSS REFERENCE TO RELATED APPLICATION

This application is based on Japanese Patent Application No. 2007-190117 filed on Jul. 20, 2007, the disclosure of which is incorporated herein by reference.

FIELD OF THE INVENTION

The present invention relates to an exhaust heat recovery apparatus.

BACKGROUND OF THE INVENTION

In general, an exhaust heat recovery apparatus is used for heating a fluid by recovering exhaust heat of exhaust gas generated from an internal combustion engine based on the principle of heat pipe. For example, Japanese Unexamined Patent Application Publication No. 7-120178 describes a heat siphon exhaust heat recovery apparatus in which heat of exhaust gas is recovered and transferred to an engine coolant of an internal combustion engine.

The described exhaust heat recovery apparatus includes an evaporator for performing heat exchange between a heat medium and the exhaust gas and a condenser for performing heat exchange between the heat medium and the engine coolant. The evaporator and the condenser are in communication with each other through a looped passage that is filled with the heat medium. The evaporator includes U-shaped tubes, which are arranged in a flow direction of the exhaust gas. The condenser includes straight tubes that extend in a flow direction of the engine coolant.

Further, the evaporator is provided with fins on outer surfaces of the tubes to increase a heat transfer surface area, thereby to facilitate heat exchange between the heat medium and the exhaust heat. The fins are brazed with the tubes.

For example, the exhaust gas flowing around the tubes of the evaporator has temperature distribution. The temperature distribution of the exhaust gas is likely to cause a temperature difference between the tubes or between respective portions in each tube. Further, if a thermal expansion difference occurs between the tubes due to the temperature difference, the fins, which are integrated with the tubes, receive a tensile load or the like. In this case, if the fins receive an excess stress, cracks will occur at fillets of brazing between the tubes and the fins.

SUMMARY OF THE INVENTION

The present invention is made in view of the foregoing matter, and it is an object of the present invention to provide an exhaust heat recovery apparatus capable of reducing damage to a fin of an evaporator.

An exhaust heat recovery apparatus includes a duct part, a heated fluid circuit, an evaporator and a condenser. The duct allows an exhaust gas generated from an internal combustion engine to flow. The heated fluid circuit allows a heated fluid to be heated by heat of the exhaust gas to flow. The evaporator includes a plurality of tubes through which an operation medium flows. The evaporator is disposed in the duct part. The evaporator evaporates the operation medium by the heat of the exhaust gas. The condenser defines an operation medium circuit through which the operation medium flows, with the evaporator such that the operation medium circulates through the evaporator and the condenser. The condenser is disposed in the heated fluid circuit. The condenser condenses the operation medium by radiating the heat of the operation medium to the heated fluid of the heated fluid circuit. The heated fluid circuit is separate from an engine coolant circuit through which an engine coolant for cooling the engine flows. The evaporator further includes a fin disposed between the tubes and joined to the tubes. The fin is provided with an operation force reducing portion that is capable of reducing an operation force applied to the fin due to a thermal expansion difference between the tubes.

For example, the operation force reducing portion is configured to allow deformation or displacement of the fin with respect to an arrangement direction of the tubes in which the tubes are arranged and in a longitudinal direction of the fin. Therefore, even if a thermal expansion difference is caused between the tubes, which are exposed to the exhaust gas, an operation force applied to the fin is reduced by the operation force reducing portion. Accordingly, damage to the fin is reduced.

BRIEF DESCRIPTION OF THE DRAWINGS

The above and other objects, features and advantages of the present invention will become more apparent from the following detailed description made with reference to the accompanying drawings, in which like parts are designated by like reference numbers and in which.

DETAILED DESCRIPTION OF PREFERRED EMBODIMENTS

First Embodiment

Figure 1:
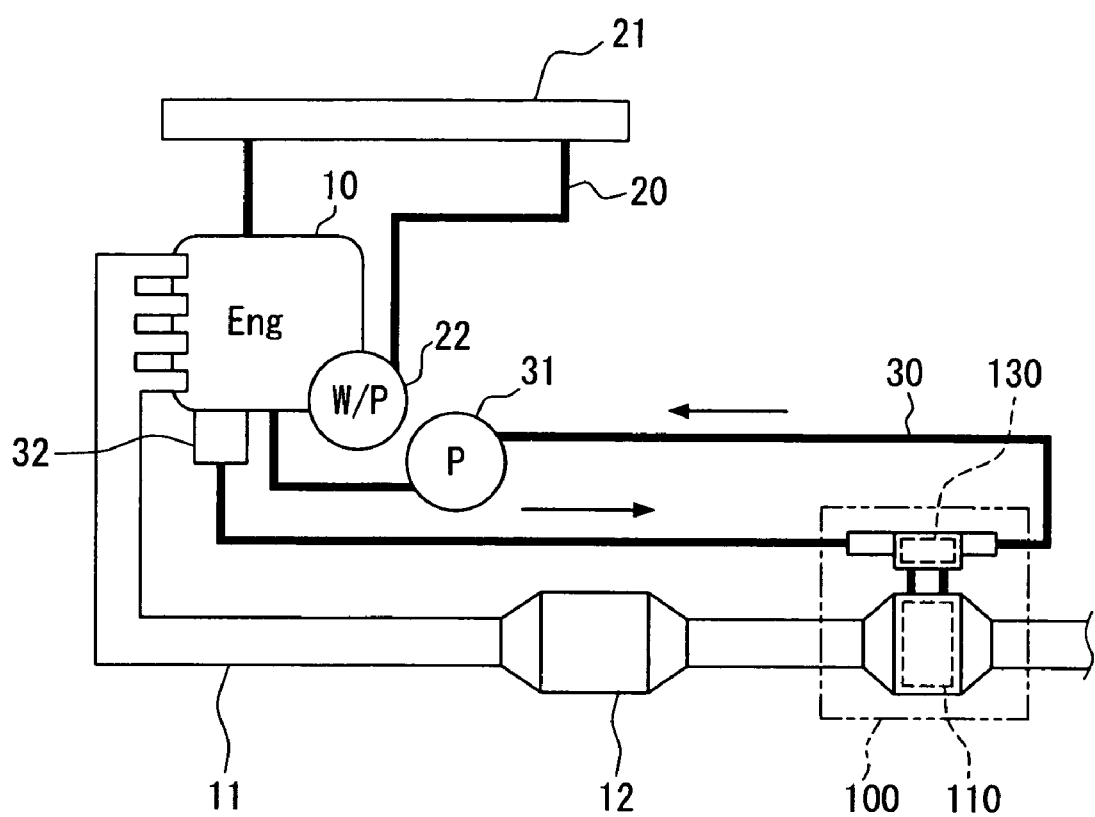
FIG. 1 is a schematic diagram of an exhaust heat recovery apparatus having an exhaust heat recovery unit according to a first embodiment of the present invention.

A first embodiment of the present invention will now be described with reference to FIGS. 1 to 7. An exhaust heat recovery unit 100 of the present embodiment is, for example, employed in a vehicle having an engine 10 as a driving source. FIG. 1 shows an exhaust heat recovery apparatus in which the unit 100 is employed.

The unit 100 generally includes an evaporator 110 and a condenser 130 and forms a closed circuit (operation medium circuit) filled with an operation medium in the evaporator 110 and the condenser 130. That is, the evaporator 110 and the condenser 130 are in communication with each other through the closed circuit. The evaporator 110 is disposed in a passage of an exhaust pipe 11 of the engine 10 through which an exhaust gas generated from the engine 10 flows. The condenser 130 is disposed in a passage of a heated fluid circuit through which a heated fluid to be heated by heat of the exhaust gas flows. In the present embodiment, the condenser 130 is disposed in a passage of an engine oil circuit 30 through which an engine oil flows.

The evaporator 110 performs heat exchange between the operation medium and the exhaust gas passing through the exhaust pipe 11. The condenser 130 performs heat exchange between the operation medium and the engine oil passing through the engine oil circuit 30. That is, heat of the exhaust gas is absorbed by the operation medium in the evaporator 110 and is transferred to the engine oil through the condenser 130.

The engine oil circuit 30 is provided with an oil tank 140, and the condenser 30 is surrounded by the oil tank 140. Thus, the engine oil circulates through the engine oil circuit 30 while receiving the heat from the condenser 130 in the oil tank 140. The engine oil circuit 30 is configured such that an inside of the engine 10, an oil cooler 32, the oil tank 140, a pump 31 are connected in the form of loop through pipes. Thus, the engine oil circulates through the engine oil circuit 30 in an order of the inside of the engine 10, the oil cooler 32, the oil tank 140, the pump 31, the inside of the engine 10. The engine oil circuit 30 forms a closed circuit.

The engine 10 is a water-cooled internal combustion engine, and includes the exhaust pipe 11, through which exhaust gas generated by fuel combustion flows. The exhaust pipe 11 is provided with a catalytic converter 12 for purifying the exhaust gas. The engine 10 is provided with a water jacket. The water jacket is in communication with a radiator circuit (engine coolant circuit) 20 through which an engine coolant for cooling the engine 10 flows. The radiator circuit 20 is separate from the engine oil circuit 30. Namely, the heat of the exhaust gas recovered in the engine oil circuit 30 through the condenser 130 is not transferred to the radiator circuit 20.

The radiator circuit 20 is provided with a radiator 21 and a water pump 22. The radiator circuit 20 is constructed by connecting the water jacket of the engine 10, the water pump 22 and the radiator 21 in the form of loop through passages. The radiator 21 is arranged at a front part of the vehicle. The radiator 21 performs heat exchange between the engine coolant, which is circulated by means of the water pump 22, and air introduced in the vehicle, thereby cooling the engine coolant.

Figure 2:
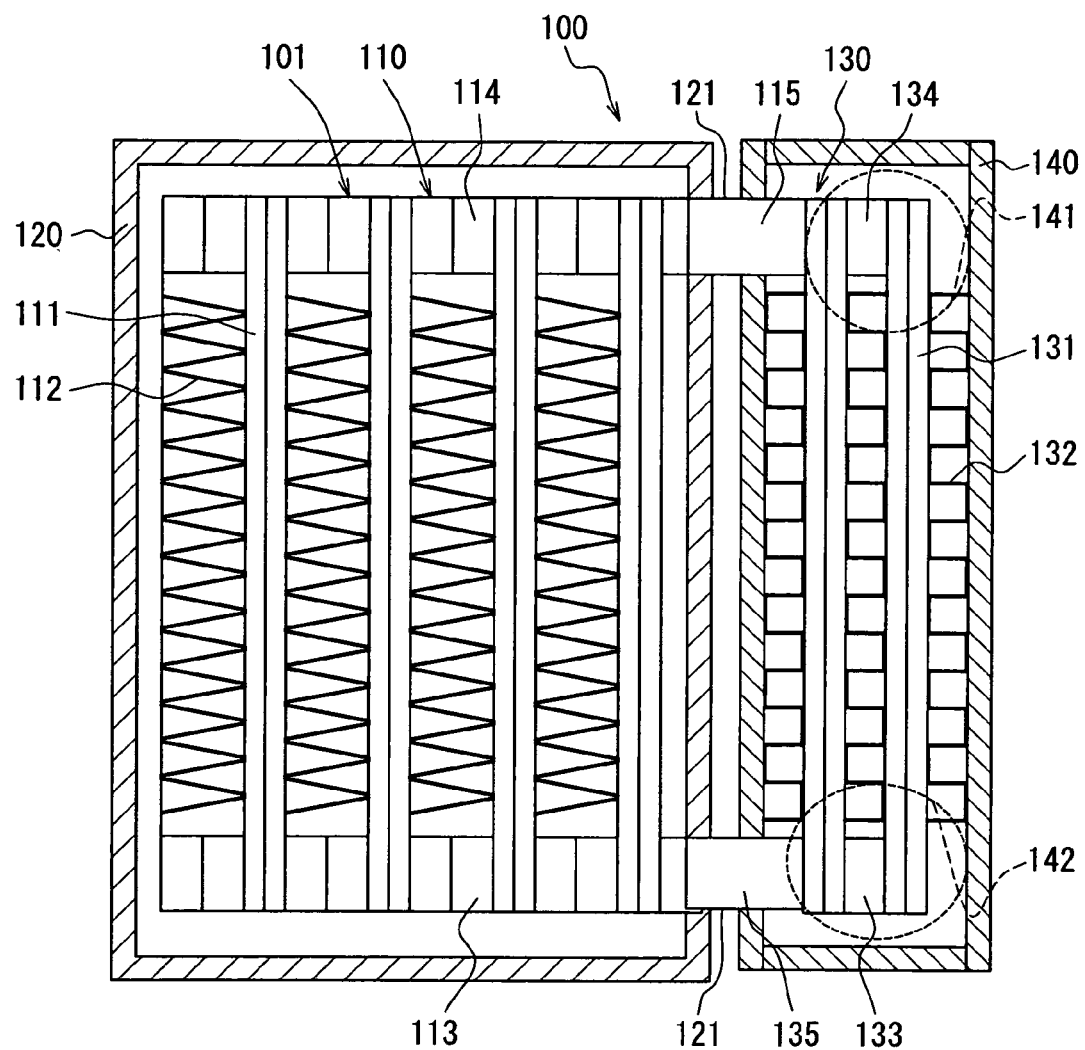
FIG. 2 is a schematic cross-sectional view of an example of the exhaust heat recovery unit according to the first embodiment.

As shown in FIG. 2, the unit 100 forms a looped heat pipe 101 in which the evaporator 110 and the condenser 130 are communicated with each other through first and second communication passages (communication pipes) 115, 135. That is, the unit 100 forms the closed circuit through which the operation medium flows. The evaporator 110 is housed in a duct part 120. The condenser 130 is housed in the oil tank 140.

The heat pipe 101 is provided with an introducing portion for introducing the operation fluid therein. When the operation medium is to be introduced in the heat pipe 101, pressure inside of the heat pipe 101 is reduced by vacuum drawing, and the operation medium is introduced in the heat pipe 101 from the introducing portion. After the heat pipe 101 is filled with the operation fluid, the introducing portion is sealed.

In the present embodiment, the operation medium is water, for example. The water has a boiling temperature of 100 degrees Celsius under 1 atmosphere. However, since the internal pressure of the heat pipe 101 is reduced, such as at 0.01 atmosphere, the operation medium has a boiling temperature in a range between 5 and 10 degrees Celsius in the heat pipe 101. The operation medium is not limited to the water, but can be any other medium such as alcohol, fluorocarbon, chlorofluorocarbon and the like.

The evaporator 110 generally includes tubes 111, fins 112, a lower tank 113, an upper tank 114 and the like. The tubes 111 are flat pipe members. The tubes 111 are oriented in an up and down direction, and arranged at predetermined intervals in an arrangement direction, such as in a right and left direction of FIG. 2. Also, the tubes 111 are arranged in rows with respect to a depth direction, such as a direction perpendicular to a paper surface of FIG. 2. The arrangement direction corresponds to a direction D1 of FIG. 4.

The fins 112 are disposed between the tubes 111. The fins 112 are joined to outer wall surfaces of the tubes 111. The fins 112 are, for example, formed by shaping thin belt-like plate member into a predetermined shape by roller shaping. In the example shown in FIG. 2, the fins 112 have a corrugate shape.

The lower tank 113 has a generally flat container shape. Likewise, the upper tank 114 has a generally flat container shape. The lower tank 113 is disposed at lower ends of the tubes 111. The upper tank 114 is disposed at upper ends of the tubes 111. The lower tank 113 and the upper tank 114 are formed with tube insertion holes at positions corresponding to the tubes 111 and with the same number of the tubes 111. The upper ends and the lower ends of the tubes 111 are inserted in the tube insertion holes and are joined to the lower tank 113 and the lower tank 114. Thus, the tubes 111 are in communication with the lower tank 113 and the upper tank 114.

The duct part 120 is a tubular member having a rectangular-shaped cross-section. The duct part 120 is in communication with the exhaust pipe 11 or forms a part of the exhaust pipe 11 to allow the exhaust gas to pass through. The duct part 120 houses the evaporator 110 therein such that a flow direction of the exhaust gas coincides with the depth direction of the evaporator 110. That is, the exhaust gas flows in the duct part 120 in a direction perpendicular to the paper surface of FIG. 2.

The condenser 130 generally includes tubes 131, fins 132, a lower tank 133, an upper tank 134 and the like. The tubes 131 are oriented in the up and down direction and are arranged at predetermined intervals. The fins 132 are disposed between the tubes 131 and joined to outer surfaces of the tubes 131. The fins 132 have a crank shape, for example. The lower tank 133 is joined to lower ends of the tubes 131, and the upper tank 134 is joined to upper ends of the tubes 131. Thus, the tubes 131 are in communication with the lower tank 133 and the upper tank 134.

The oil tank 140 is a container having a length in a longitudinal direction of the tubes 131. An inlet pipe 141 is coupled to an end of the oil tank 140 for introducing the engine oil in the oil tank 140. An outlet pipe 142 is coupled to another end of the oil tank 140 for discharging the engine oil from the oil tank 140.

The condenser 130 is located to a side of the evaporator 110. The upper tank 114 of the evaporator 110 is in communication with the upper tank 134 of the condenser 130 through the first communication pipe 115. The first communication pipe 115 passes through a wall of the duct part 120 and a wall of the oil tank 140. The lower tank 113 of the evaporator 110 is in communication with the lower tank 133 of the condenser 130 through the second communication pipe 135. The second communication pipe 135 passes through the wall of duct part 120 and the wall of the oil tank 140.

The operation medium flows inside the unit 100 in an order of the lower tank 113, the tubes 111, the upper tank 114, the first communication pipe 115, the upper tank 134, the tubes 131, the lower tank 133, the second communication pipe 135, the lower tank 113. That is, the unit 100 forms the closed looped passage of the operation medium. The second communication pipe 135 serves as a return pipe.

A predetermined clearance is provided between the wall of the duct part 120 and the wall of the oil tank 140. Portions of the first and second communication pipes 115, 135 extending between the wall of the duct part 120 and the wall of the oil tank 140 and the clearance serve a thermal insulation portion 121.

Figure 4:
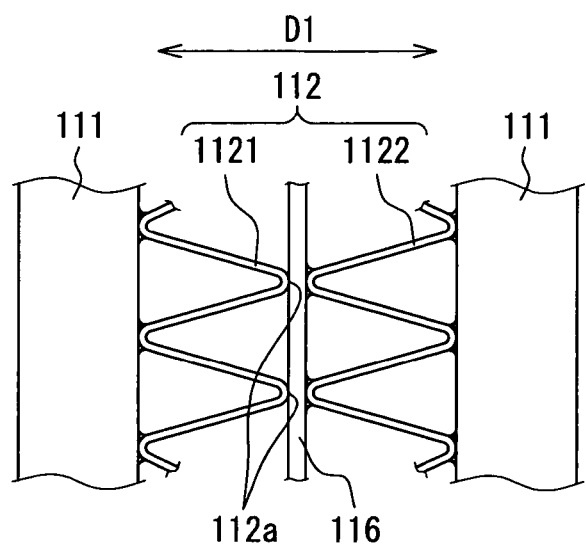
FIG. 4 is an enlarged view of tubes and a fin of an evaporator of the exhaust heat recovery unit according to the first embodiment.

For example, the fin 112 is formed in layers between the adjacent tubes 111 with respect to the arrangement direction D1. In an example shown in FIG. 4, a first fin layer 1121 and a second fin layer 1122 are disposed between the adjacent two tubes 111, as shown in FIG. 4. The first fin layer 1121 is joined to an outer surface of a first tube 111 (e.g., left tube 111 in FIG. 4) through fillets by brazing. In other words, the first fin layer 1121 has contact portions that contact the first tube 111 through the fillets. The second fin layer 1122 is joined to an outer surface of a second tube 111 (e.g., right tube 111 in FIG. 4) through fillets by brazing. In other words, the second fin layer 1122 has contact portions that contact the second tube 111 through the fillets.

A plate 116 is provided between the first fin layer 1121 and the second fin layer 1122. The plate 116 is a thin plate member and serves as a partition member. The pate 116 is joined to one of the first and second fin layers 1121, 1122 and is not jointed to the other of the first and second fin layers 1121, 1122. In the example shown in FIG. 4, the plate 116 is joined to the second fin layer 1122. The plate 116 is not jointed to the first fin layer 1121. Thus, non-joining portions 112a are defined between the first fin layer 1121 and the plate 116. The non-joining portions 112a serve as operation force reducing portions and are located in a generally middle position of the fin 112 with respect to the arrangement direction D1.

The non-joining portions 112a, that is, the operation force reducing portions are provided between the fin 112 and the plate 116 such that the fin layers 1121, 1122 are displaceable or deformable in the arrangement direction and in the longitudinal direction in accordance with thermal expansion of the tubes 111. That is, the operation force reducing portions reduce an operation force from being generated to the fin layers 1121, 1122 due to a thermal expansion difference of the tubes 111. As such, it is less likely that the fin 112 will be damaged due to the thermal expansion difference of the tubes 111.

In the example shown in FIG. 4, the fin 112 is formed in two layers between the adjacent two tubes 111. As another example, the fin 112 is formed in multiple layers, such as three or more than three layers, between the adjacent two tubes 111, as shown in FIG. 5.

Figure 5:
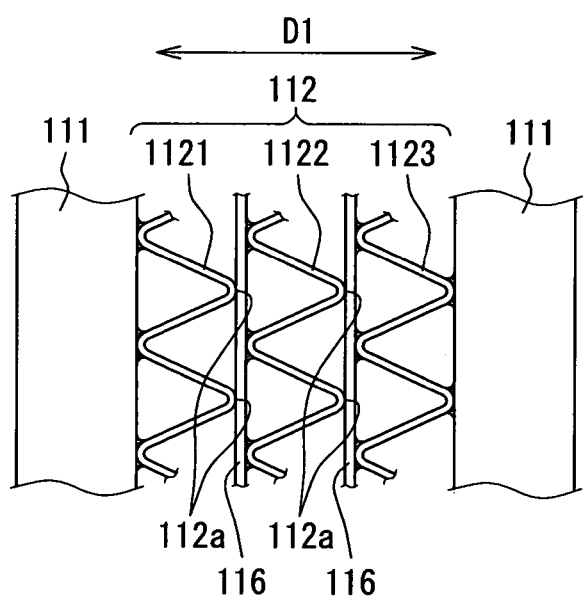
FIG. 5 is an enlarged view of the tubes and the fin of the evaporator, for showing a modification of the fin, according to the first embodiment.

In the another example shown in FIG. 5, the first fin layer 1121, the second fin layer 1122, and a third fin layer 1123 are formed between the adjacent two tubes 111 with respect to the arrangement direction D1. The plates 116 are disposed between the fin layers 1121, 1122, 1123. Also in this case, the non-joining portions 112a are provided at middle positions of the fin 112 with respect to the arrangement direction D1. For example, the non-joining portions 112a are provided at contact portions between the first fin layer 1121, which is joined to the tube 111, and one plate 116 and between the second fin layer 1122 and another plate 116. Also in this structure, damage to the fin 112 is reduced.

In the unit 100, the duct 120 is in communication with the exhaust pipe 11, downstream of the catalytic converter 12. The inlet pipe 141 and the outlet pipe 142 of the oil tank 140 are in communication with the engine oil circuit 30, which serves as an exhaust heat recovery circuit.

The above-described component parts of the unit 100 are, for example, made of stainless steel having high corrosion resistance. After being assembled, the component parts are integrally brazed by a brazing material provided at contact portions or engagement portions of the component parts.

In the examples shown in FIGS. 1, 4, 5, the fins 112 have the corrugate shape and the operation force reducing portions are provided by the non-joining portions 112a. However, the shape of the fins 112 and the structure of the operation force reducing portions are not limited to the above, but may be modified in various ways, such as in manners shown in FIGS. 6 and 7.

Figure 6:
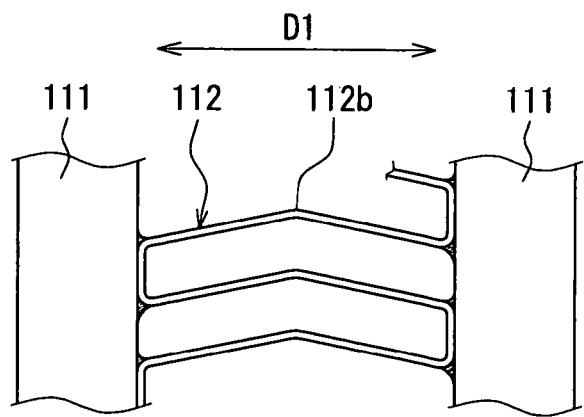
FIG. 6 is an enlarged view of the tubes and the fin of the evaporator, for showing another modification of the fin, according to the first embodiment.

In the example shown in FIG. 6, the corrugate fin 112 is disposed between the adjacent two tubes 111. The fin 112 has bends 112b at a substantially middle position with respect to the arrangement direction D1. The bends 112b serve as the operation force reducing portions in the fin 112. That is, the bends 112b allows the fin 112 to expand and contract in the arrangement direction D1 by reducing and increasing its bent angle. For example, when receiving a tensile force, the fin 112 is capable of expanding such that the bent angle increases, that is, the bents 112b becomes generally straight. Even when the operation force such as a tensile force or a compression force is applied to the fin 112, the operation force is alleviated by expansion or contraction of the fin 112 in the arrangement direction D1 by means of the bend 112b. Therefore, it is less likely that the fins 112 will be damaged due to the operation force.

Figure 7:
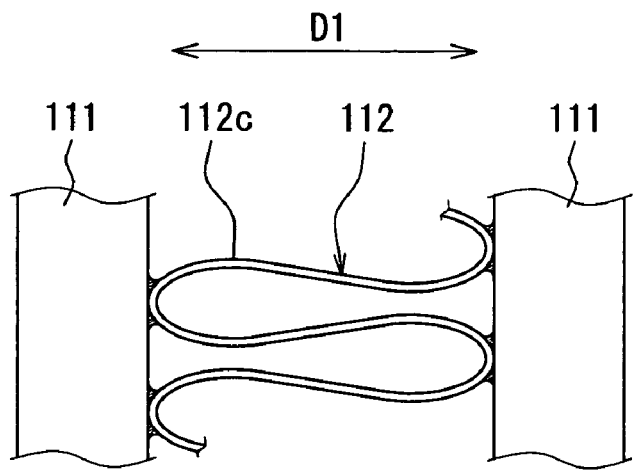
FIG. 7 is an enlarged view of the tubes and the fin of the evaporator, for showing yet another modification of the fin, according to the first embodiment.

In the example shown in FIG. 7, the corrugate fin 112 is disposed between the adjacent two tubes 111. The entirety of the fin 112 has a wave form, such as repetitive S-shapes and includes curved portions 112c that are curved with respect to the arrangement direction D1. The curved portions 112c serve as the operation force reducing portions in the fin 112. Therefore, the fin 112 is capable of expanding and contracting in the arrangement direction D1 by reducing and increasing the curvature of the curved portions 112c. As such, even when the operation force, such as a tensile force or a compression force, is applied to the fin 112, the operation force is alleviated by means of the curved portions 112c. It is less likely that the fins 112 will be damaged due to the operation force.

Next, an operation and advantageous effects of the unit 100 will be described.

When the engine 10 is operated, the water pump 22 and the pump 31 are also operated, so that the engine coolant circulates through the radiator circuit 20, and the engine oil circulates through the engine oil circuit 30. The exhaust gas generated in the engine 10 flows through the exhaust pipe 11. After passing through the catalytic converter 12, the exhaust gas passes through the evaporator 110 of the unit 100 and is discharged to outside. The engine oil of the engine oil circuit 30 passes through the oil tank 140, that is, around the tubes 131 of the condenser 130.

After the operation of the engine 10 begins, the operation medium of the heat pipe 101 receives the heat of the exhaust gas passing through the duct part 120, while flowing through the evaporator 110. In the tubes 111 of the evaporator 110, the operation medium begins to evaporate and flows upward.

Further, the evaporated operation medium flows in the upper tank 134 through the upper tank 114 of the evaporator 110 and the first communication pipe 115. In the condenser 130, the evaporated operation medium is cooled by the engine oil passing through the oil tank 140, and is condensed. The condensed operation medium returns to the lower tank 113 of the evaporator 110 through the second communication pipe 135.

By the above circulation of the operation medium, the heat of the exhaust gas is transferred to the operation medium in the evaporator 110, carried into the condenser 130, and is then released as latent heat of condensation while the operation medium is condensed in the condenser 130. Thus, the engine oil of the engine oil circuit 30 is heated in a positive manner, thereby to facilitate warming up the engine 10. Therefore, friction loss of the engine 10 is reduced, and an increase in fuel for improving cold starting is restricted. Accordingly, fuel efficiency of the engine 10 improves. In the unit 100, a part of the heat of the exhaust gas is conducted from the evaporator 110 to the condenser 130 through an outer wall of the heat pipe 101.

Because the evaporator 110 has the plural tubes 111 and the plural fins 112, an area for receiving the heat from the exhaust gas is increased. Therefore, evaporation of the operation medium in the evaporator 110 is facilitated, and hence the amount of heat carried to the condenser 130 is increased.

Since the thermal insulation portion 121 is provided between the evaporator 110 and the condenser 130, the evaporator 110 is restricted from being cooled by the engine oil passing through the oil tank 140. Therefore, it is less likely that a condensing operation will occur in the evaporator 110.

Figure 3:
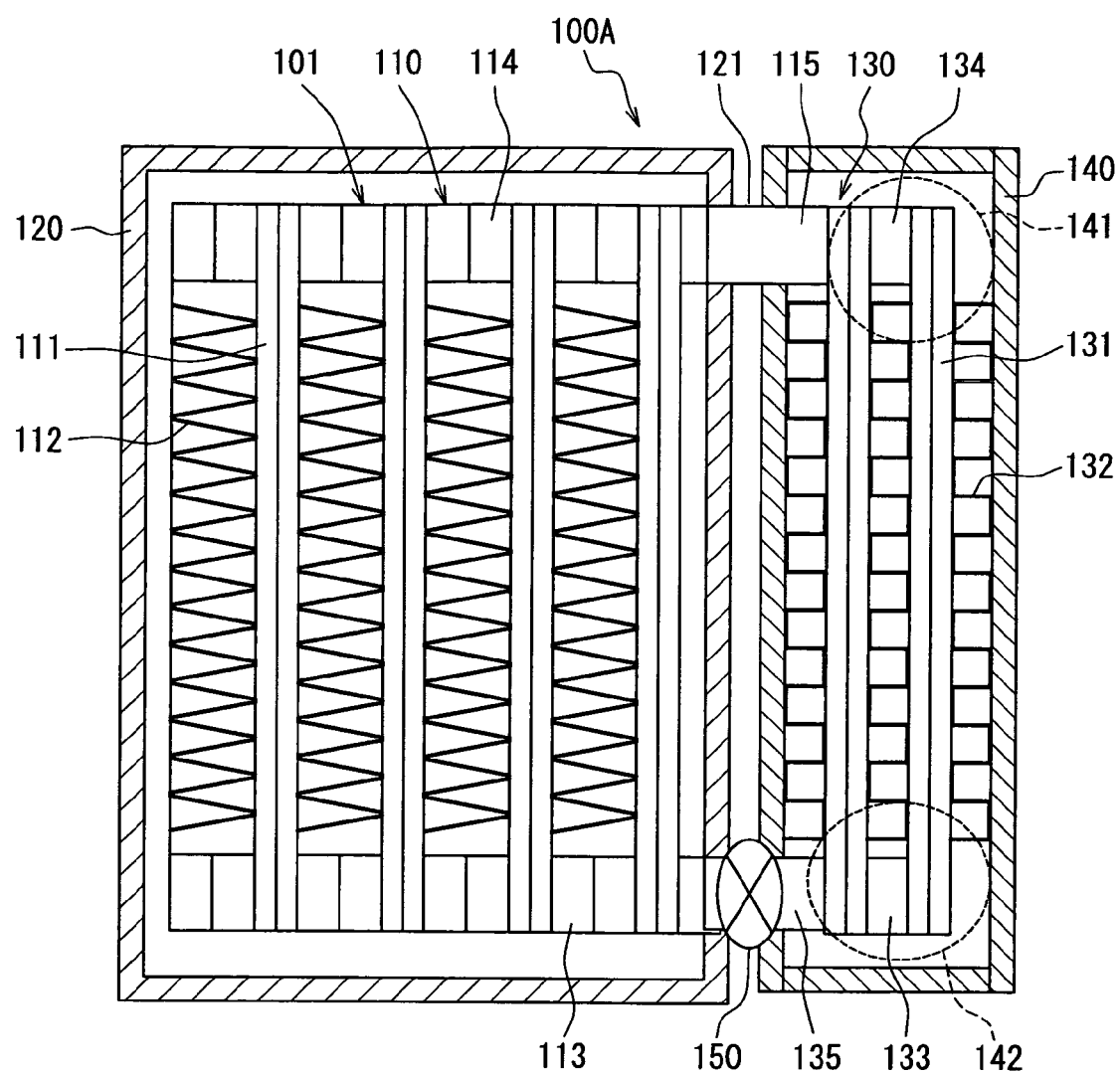
FIG. 3 is a schematic cross-sectional view of another example of the exhaust heat recovery unit according to the first embodiment.

FIG. 3 shows a modification of the exhaust heat recovery unit 100. In a modified unit 100A shown in FIG. 3, the second communication pipe 135 is provided with a valve mechanism 150 as a flow control device. Portions of the unit 100A other than the valve mechanism 150 are similar to those of the unit 100 shown in FIG. 2.

The valve mechanism 150 may have any structures that are capable of controlling the flow rate of the operation medium flowing through the second communication pipe 135 from the condenser 130 to the evaporator 110. For example, the valve mechanism 150 is a diaphragm valve, which is capable of opening and closing the passage of the second communication pipe 135 in accordance with the internal pressure of the heat pipe 101, that is, the pressure of the operation medium. The valve mechanism 150 closes the passage when the internal pressure of the heat pipe 101 exceeds a predetermined pressure (valve closing pressure), and opens the passage when the internal pressure is equal to or lower than the predetermined pressure.

In the unit 100A having the valve mechanism 150, the temperature of the engine oil is increased after the operation of the engine 10 is started. With this, the internal pressure of the heat pipe 101 gradually increases. Because the amount of exhaust heat varies depending on a load condition of the engine 10, the internal pressure may vary in accordance with various operation conditions of a vehicle, such as acceleration, deceleration, stopping, and the like.

In a condition that the internal pressure is lower than the predetermined pressure while the internal pressure of the heat pipe 101 increases, the valve mechanism 150 opens the passage so that the heat of the exhaust gas is transferred to the engine oil. That is, the exhaust heat recovery is performed.

When the temperature of the engine oil exceeds a predetermined temperature and the internal pressure of the heat pipe 101 exceeds the predetermined pressure, the valve mechanism 150 closes the passage to restrict the condensed operation medium from flowing back to the evaporator 110. As such, the operation medium in the evaporator 110 is completely evaporated (dried out) and introduced in the condenser 130. The condensed operation medium is stored in the condenser 130.

That is, heat transfer in response to the evaporation and condensation of the operation medium is stopped. In other words, the exhaust heat recovery is stopped. In this case, the heat is only conducted to the engine oil through the heat pipe 101. If the exhaust heat recovery is continued while the temperature of the exhaust heat increases due to an increase in load of the engine 10, the temperature of the engine oil is increased excessively, and thus the heat is excessively radiated to the engine 10. In the present embodiment, on the other hand, the exhaust heat recovery is stopped as discussed above. Therefore, it is less likely that the engine oil will be excessively heated.

When the internal pressure of the heat pipe 101 reduces equal to or lower than the predetermined pressure, the valve mechanism 150 reopens the passage. Thus, the exhaust heat recovery is restarted.

To restart the exhaust heat recovery in the unit 100A, for example, the valve mechanism 150 opens the passage so that the condensed operation medium is introduced in the tubes 111 of the evaporator 110 from the condenser 130. In this case, the flow rate of the operation medium is likely to be different between the tubes 111 due to the difference of distance from the valve mechanism 150. The difference of thermal expansion between the tubes 111 will be increased due to the unevenness of the flow rate in addition to the temperature distribution of the flow of the exhaust gas. As a result, the operation force applied between the tubes 111 and the fins 112 will become notable. In the present embodiment, the fins 112 have the operation force reducing portions such as the non-joining portions 112a, the bends 112b, the curved portions 112c. Therefore, the operation force can be effectively alleviated.

In the example shown in FIG. 4, the fin 112 is formed in layers between the adjacent two tubes 111. That is, at least the first fin layer 1121 and the second fin layer 1122 are formed between the adjacent two tubes 111. The non-joining portions 112a are provided between the first fin layer 1121 and the second fin layer 1122, as the operation force reducing portions. Therefore, even when the tubes 111 have the temperature difference due to the temperature distribution of the exhaust gas passing through the duct part 120 and further have the difference of thermal expansion, the operation force, such as tensile force, to the fin 112 can be alleviated.

Further, the plate 116 is provided between the first fin layer 1121 and the second fin layer 1122. Therefore, when the evaporator 110 is assembled, it is less likely that the first fin layer 1121 and the second fin layer 1122 are overlapped such that the projections of the first fin layer 1121 are received in the recess of the second fin layer 1122. Accordingly, the evaporator 110 is easily and properly assembled. In the example shown in FIG. 5, the similar effects are achieved.

The oil tank 140 is in communication with the engine oil circuit 30 as the heated fluid circuit, so that the engine oil as a heated fluid is heated by the condenser 130. That is, in the present embodiment, the unit 100, 100A is exemplarily employed to recover the heat of the exhaust gas and use the heat to warn up the engine 10, thereby to improve an engine warming performance.

Second Embodiment

Figure 8:
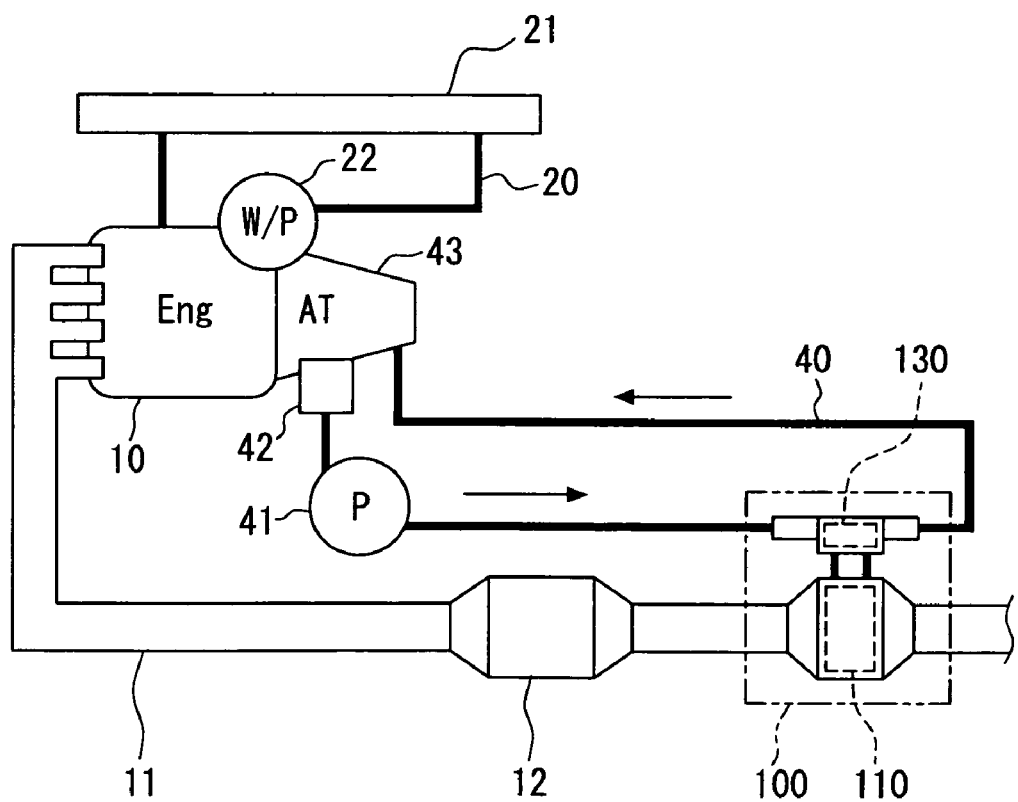
FIG. 8 is a schematic diagram of an exhaust heat recovery apparatus according to a second embodiment of the present invention.

FIG. 8 shows an exhaust heat recovery apparatus of the second embodiment, which has a structure different from that of the first embodiment. The unit 100, 100A of the first embodiment can be employed to the exhaust gas recovery apparatus of the present embodiment shown in FIG. 8.

The exhaust heat recovery apparatus of the present embodiment has an ATF (automatic transmission fluid) circuit 40 through which an ATF (automatic transmission fluid) flows as the heated fluid circuit, in place of the engine oil circuit 30 of the first embodiment. Structures other than the ATF circuit 40 are similar to structures of the first embodiment.

The oil tank 140 of the unit 100, 100A is disposed in communication with the ATF circuit 40. Thus, the heat of the exhaust gas absorbed by the operation medium in the evaporator 110 can be transferred to the ATF through the condenser 130. That is, the ATF circulates through the ATF circuit 40 while being heated by the condenser 130.

In the ATF circuit 40, an automatic transmission 43 of the vehicle, a cooler 42, a pump 41, the oil tank 140 are connected through pipes such that a closed, looped passage of the ATF is formed. The ATF circulates through the ATF circuit 40 in an order of the automatic transmission 43, the cooler 42, the pump 41, the oil tank 140, the automatic transmission 43.

The ATF circuit 40 is separate from the radiator circuit 20. Thus, the heat recovered to the ATF circuit 40 through the condenser 130 is not transferred to the radiator circuit 20.

Next, an operation and advantageous effects of the exhaust heat recovery apparatus of the present embodiment will be described. When the engine 10 is operated, the water pump 22 and the pump 41 are also operated, so that the engine coolant circulates through the radiator circuit 20, and the ATF circulates through the ATF circuit 40. The exhaust gas generated from the engine 10 flows through the exhaust pipe 11. After passing through the catalytic converter 12, the exhaust gas passes through the evaporator 110 and is discharged to outside. The ATF of the ATF circuit 40 passes through the oil tank 140, that is, around the tubes 131 of the condenser 130.

After the operation of the engine 10 is started, the operation medium of the heat pipe 101 receives the heat of the exhaust gas passing through the duct part 120, while flowing through the evaporator 110. In the tubes 111 of the evaporator 110, the operation medium begins to evaporate and flows upward. Further, the evaporated operation medium flows in the upper tank 134 through the upper tank 114 of the evaporator 110 and the first communication pipe 115. In the condenser 130, the evaporated operation medium is cooled by the ATF passing through the oil tank 140, and is condensed. The condensed operation medium flows in the lower tank 113 of the evaporator 110 through the second communication pipe 135.

By the above circulation of the operation medium, the heat of the exhaust gas is transferred to the operation medium in the evaporator 110, carried in the condenser, and is then released as latent heat of condensation while the operation medium is condensed in the condenser 130. Thus, the ATF of the ATF circuit 40 is heated in a positive manner, thereby to facilitate warming up of the automatic transmission 43. Therefore, the operation of the automatic transmission 43 improves.

In the present embodiment, the oil tank 140 is in communication with the ATF circuit 40 as the heated fluid circuit, so that the ATF as the heated fluid is heated by the condenser 130. That is, in the present embodiment, the unit 100, 100A is employed to recover the heat of the exhaust gas and use the heat to warn up the automatic transmission 43, thereby to improve a warming performance of the automatic transmission 43.

Third Embodiment

Figure 9:
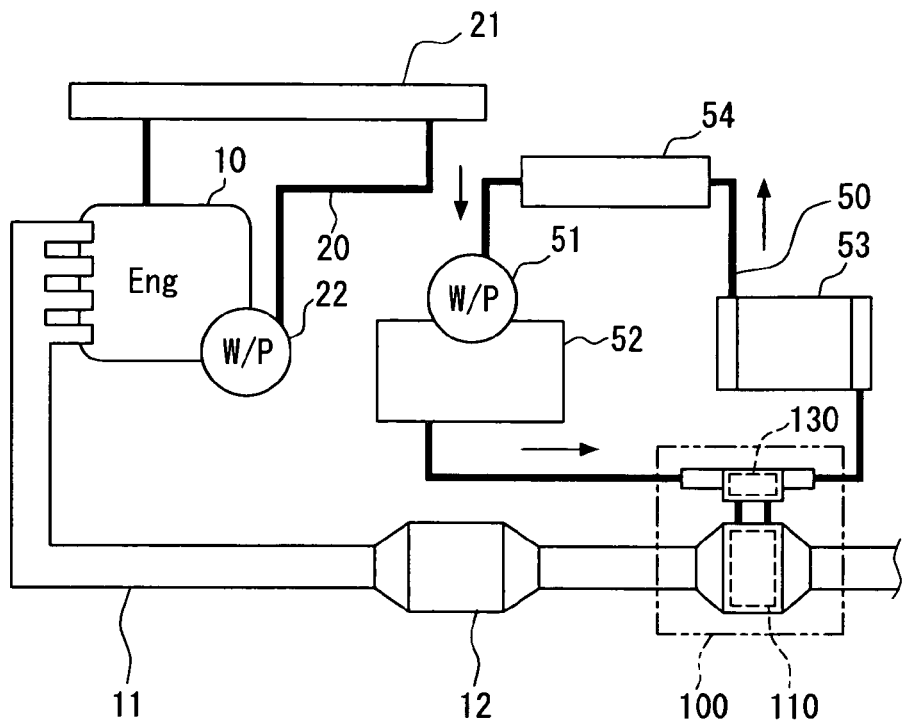
FIG. 9 a schematic diagram of an exhaust heat recovery apparatus according to a third embodiment of the present invention.

FIG. 9 shows an exhaust heat recovery apparatus of a third embodiment of the present invention, which has a structure different from that of the first embodiment. The unit 100, 100A of the first embodiment can be employed to the exhaust gas recovery apparatus of the present embodiment shown in FIG. 9. The exhaust heat recovery apparatus of the present embodiment is exemplarily employed to a hybrid vehicle having an engine and a driving motor as a driving source.

The exhaust heat recovery apparatus of the present embodiment has an inverter radiator circuit 50 through which an inverter coolant for cooling an inverter 52 flows as the heated fluid circuit, in place of the engine oil circuit 30 of the first embodiment. Structures other than the inverter radiator circuit 50 are similar to structures of the first embodiment. The inverter 52 is provided to control the driving motor.

The oil tank 140 of the unit 100, 100A is disposed in communication with the inverter radiator circuit 50. Thus, the heat of the exhaust gas absorbed by the operation medium in the evaporator 110 can be transferred to the inverter coolant of the inverter radiator circuit 50 through the condenser 130. That is, the inverter coolant circulates through the inverter radiator circuit 50 while being heated by the condenser 130.

In the inverter radiator circuit 50, the inverter 52, the oil tank 140, a heater core 53, an inverter radiator 54 and a pump 51 are connected through pipes such that a closed, looped passage of the inverter coolant is formed. The inverter coolant circulates through the inverter radiator circuit 50 in an order of the inverter 52, the oil tank 140, the heater core 53, the inverter radiator 54, the pump 51, the inverter 52.

The inverter radiator 54 performs heat exchange between the inverter coolant flowing inside of the inverter radiator 54 and air flowing outside of the inverter radiator 54, thereby radiating the heat of the inverter coolant. Then the inverter coolant is introduced in the inverter 52. The heater core 53 is a heat exchanger that performs heat exchange between the heated inverter coolant and air, thereby to heat the air. The heated air is used for an air conditioning operation of a passenger compartment of the vehicle. That is, the heated air contributes to improve a heating performance of the air conditioning operation.

The inverter radiator circuit 50 is separate from the radiator circuit 20. Thus, the heat recovered to the inverter radiator circuit 50 through the condenser 130 is not transferred to the radiator circuit 20.

Next, an operation and advantageous effects of the exhaust heat recovery apparatus of the present embodiment will be described. When the engine 10 is operated, the water pump 22 and the pump 51 are also operated, so that the engine coolant circulates through the radiator circuit 20, and the inverter coolant circulates through the inverter radiator circuit 50. The exhaust gas generated in the engine 10 flows through the exhaust pipe 11. After passing through the catalytic converter 12, the exhaust gas passes through the evaporator 110 of the unit 100 and is discharged to outside. The inverter coolant of the inverter radiator circuit 50 passes through the oil tank 140, that is, around the tubes 131 of the condenser 130.

After the operation of the engine 10 begins, the operation medium of the heat pipe 101 receives the heat of the exhaust gas passing through the duct part 120, while flowing through the evaporator 110. In the tubes 111 of the evaporator 110, the operation medium begins to evaporate and flows upward. Further, the evaporated operation medium flows in the upper tank 134 through the upper tank 114 of the evaporator 110 and the first communication pipe 115. In the condenser 130, the evaporated operation medium is cooled by the inverter coolant passing through the oil tank 140, and is condensed. The condensed operation medium returns to the lower tank 113 of the evaporator 110 through the second communication pipe 135.

By the above circulation of the operation medium, the heat of the exhaust gas is transferred to the operation medium in the evaporator 110, carried into the condenser 130, and is then released as latent heat of condensation while the operation medium is condensed in the condenser 130. Thus, the inverter coolant of the inverter radiator circuit 50 is heated in a positive manner, thereby to improve a heating performance of the heater core 53.

In the present embodiment, the oil tank 140 is in communication with the inverter radiator circuit 50 as the heated fluid circuit, so that the inverter coolant as the heated fluid is heated by the condenser 130. That is, in the present embodiment, the unit 100, 100A is exemplarily employed to recover the heat of the exhaust gas and use the heat for the heater core 53, thereby to improve the heating performance of the heater core 53.

Fourth Embodiment

Figure 10:
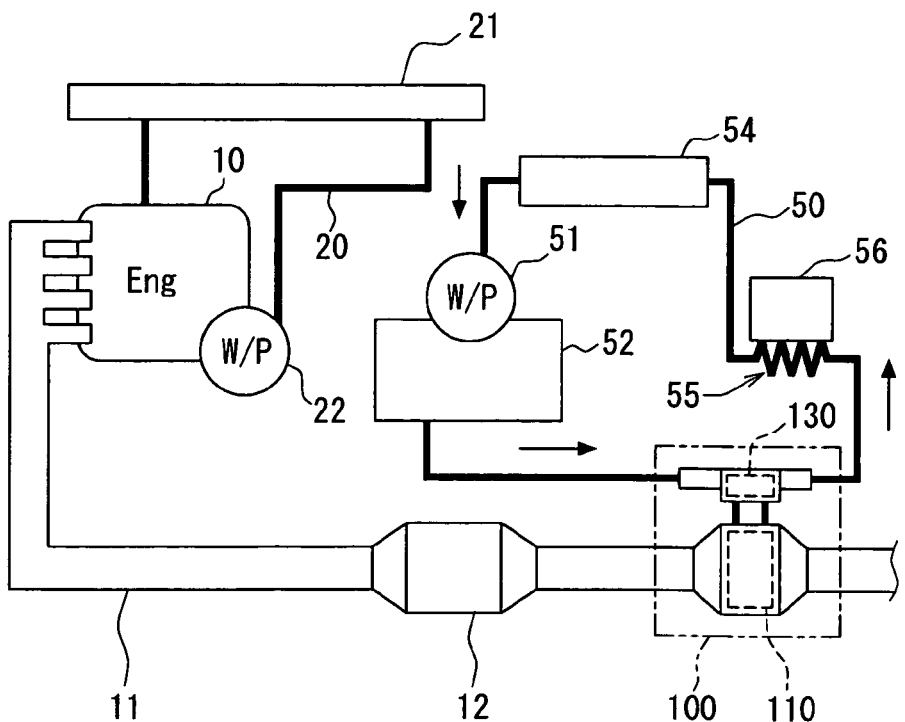
FIG. 10 is a schematic diagram of an exhaust heat recovery apparatus according to a fourth embodiment of the present invention.

FIG. 10 shows an exhaust heat recovery apparatus of the fourth embodiment, which has a structure different from that of the third embodiment. The unit 100, 100A of the first embodiment can be employed to the exhaust gas recovery apparatus of the present embodiment shown in FIG. 10.

The exhaust heat recovery apparatus of the present embodiment has an inverter radiator circuit 50 that has a structure different from the inverter radiator circuit 50 of the third embodiment. Specifically, the inverter radiator circuit 50 of the present embodiment has a heated fluid-type heating member 55 for heating a battery 56, in place of the heater core 53 of the third embodiment. The battery 56 supplies the driving motor with electric power. Structures other than the heating member 55 and the battery 56 are similar to structures of the third embodiment.

The oil tank 140 of the unit 100, 100A is disposed in communication with the inverter radiator circuit 50. Thus, the heat of the exhaust gas absorbed by the operation medium in the evaporator 110 can be transferred to the inverter coolant through the condenser 130. That is, the inverter coolant circulates through the inverter radiator circuit 50 while being heated by the condenser 130.

In the inverter radiator circuit 50, the inverter 52, the oil tank 140, the heating member 55, the inverter radiator 54 and the pump 51 are connected through pipes such that a closed, looped passage of the coolant is formed. The inverter coolant circulates through the inverter radiator circuit 50 in an order of the inverter 52, the oil tank 140, the heating member 55, the inverter radiator 54, the pump 51, the inverter 52.

The heating member 55 is a heat exchanger that performs heat exchange between the heated inverter coolant and air, thereby to heat the air. The heated air is applied to the battery 56, thereby to facilitate warming of the battery 56.

In the present embodiment, the oil tank 140 is in communication with the inverter radiator circuit 50 as the heated fluid circuit, so that the inverter coolant as the heated fluid is heated by the condenser 130. That is, in the present embodiment, the unit 100, 100A is employed to recover the heat of the exhaust gas and use the heat for facilitating the warming up of the battery 56. Therefore, charging efficiency of the battery 56 improves.

Other Embodiments

Additional advantages and modifications will readily occur to those skilled in the art. The invention in its broader term is therefore not limited to the specific details, representative apparatus, and illustrative examples shown and described.

In the unit 100, 100A of the above embodiments, the condenser 130 is arranged at the side of the evaporator 110. However, the arrangement of the evaporator 110 and the condenser 130 can be modified. For example, the condenser 130 may be arranged above the evaporator 110. In this case, the condenser 130 may be oriented such that the tubes 131 are horizontally arranged.

The valve mechanism 150 is not limited to the diaphragm-type valve device that opens and closes the passage in accordance with the pressure of the operation medium. For example, the valve mechanism 150 can be a thermo wax-type valve device that is capable of opening and closing the passage in accordance with the temperature of the heated fluid or the temperature of the operation medium.

What is claimed is:

1. An exhaust heat recovery apparatus for a vehicle that includes an engine and an engine coolant circuit through which an engine coolant for cooling the engine flows, the exhaust heat recovery apparatus comprising:
    an evaporator including a plurality of tubes through which an operation medium flows and disposed in a flow of exhaust gas generated from the engine, the evaporator evaporating the operation medium by heat of the exhaust gas;
    a heated fluid circuit through which a heated fluid to be heated by heat of the exhaust gas flows; and
    a condenser defining an operation medium circuit through which the operation medium flows, with the evaporator, such that the operation medium circulates through the evaporator and the condenser, the condenser disposed in a passage of the heated fluid circuit, the condenser condensing the operation medium therein by radiating heat of the operation medium to the heated fluid of the heated fluid circuit, wherein
    the heated fluid circuit is separate from the engine coolant circuit,
    the evaporator further includes a fin disposed between the tubes and joined to the tubes, and
    the fin is provided with an operation force reducing portion that is capable of reducing an operation force applied to the fin due to a thermal expansion difference between the tubes,
    the fin includes at least a first fin layer and a second fin layer between the tubes,
    the fin further includes a plate between the first fin layer and the second fin layer,
    the plate is joined to the first fin layer and is not joined to the second fin layer to define a non-joining portion between the plate and the second fin layer, and
    the operation force reducing portion is provided by the non-joining portion.

2. The exhaust heat recovery apparatus according to claim 1, wherein the first fin layer and the second fin layer have a corrugate shape.

3. The exhaust heat recovery apparatus according to claim 1, further comprising:
    a communication pipe between the evaporator and the condenser, the communication pipe defining a part of the operation fluid circuit and allowing the operation medium to flow from the condenser to the evaporator; and
    a valve mechanism disposed in the communication pipe, wherein
    the valve mechanism is capable of opening and closing a passage of the communication pipe in accordance with one of pressure of the operation medium, a temperature of the heated fluid, and a temperature of the operation medium.

4. The exhaust heat recovery apparatus according to claim 1, wherein
the heated fluid circuit is an engine oil circuit in communication with the engine, and
the heated fluid is an engine oil.

5. The exhaust heat recovery apparatus according to claim 1, wherein
the heated fluid circuit is an automatic transmission fluid circuit in communication with an automatic transmission of the vehicle, and
the heated fluid is an automatic transmission fluid.

6. The exhaust heat recovery apparatus according to claim 1, wherein
the heated fluid circuit is an inverter radiator circuit which connects an inverter for controlling a driving motor of the vehicle, an inverter radiator for cooling the inverter, a heater core and the condenser, and
the heated fluid is an inverter coolant.

7. The exhaust heat recovery apparatus according to claim 1, wherein
the heated fluid circuit is an inverter radiator circuit which connects an inverter for controlling a driving motor of the vehicle, an inverter radiator for cooling the inverter, a heating member and the condenser,
the heating member is capable of heating a battery that supplies the engine with electric power, and
the heated fluid is an inverter coolant.

8. The exhaust heat recovery apparatus according to claim 1, wherein the non-joining portion provides displaceable configuration between the plate and the second fin layer.

9. An exhaust heat recovery apparatus for a vehicle that includes an engine and an engine coolant circuit through which an engine coolant for cooling the engine flows, the exhaust heat recovery apparatus comprising:
an evaporator including a plurality of tubes through which an operation medium flows and disposed in a flow of an exhaust gas generated from the engine, the evaporator evaporating the operation medium by heat of the exhaust gas;
a heated fluid circuit through which a heated fluid to be heated by the heat of the exhaust gas flows; and
a condenser defining an operation medium circuit through which the operation medium flows, with the evaporator, such that the operation medium circulates through the evaporator and the condenser, the condenser disposed in a passage of the heated fluid circuit, the condenser condensing the operation medium therein by radiating heat of the operation medium to the heated fluid of the heated fluid circuit, wherein
the heated fluid circuit is separate from the engine coolant circuit,
the evaporator further includes a fin disposed between the tubes and joined to the tubes, and
the fin is provided with an operation force reducing portion that is capable of reducing an operation force applied to the fin due to a thermal expansion difference between the tubes,
the fin has a bend defining a convex part heading to a direction being parallel to a long side of the tubes,
the convex part is at a substantially middle position with respect to an arrangement direction in which the plurality of tubes is arranged, and
the operation force reducing portion is provided by the bend.

10. The exhaust heat recovery apparatus according to claim 9, wherein
the fin is a corrugate fin.

11. The exhaust heat recovery apparatus according to claim 9, further comprising:
a communication pipe between the evaporator and the condenser, the communication pipe defining a part of the operation fluid circuit and allowing the operation medium to flow from the condenser to the evaporator; and
a valve mechanism disposed in the communication pipe, wherein
the valve mechanism is capable of opening and closing a passage of the communication pipe in accordance with one of pressure of the operation medium, a temperature of the heated fluid, and a temperature of the operation medium.

12. The exhaust heat recovery apparatus according to claim 9, wherein
the heated fluid circuit is an engine oil circuit in communication with the engine, and
the heated fluid is an engine oil.

13. The exhaust heat recovery apparatus according to claim 9, wherein
the heated fluid circuit is an automatic transmission fluid circuit and in communication with an automatic transmission of the vehicle, and
the heated fluid is an automatic transmission fluid.

14. The exhaust heat recovery apparatus according to claim 9, wherein
the heated fluid circuit is an inverter radiator circuit which connects an inverter for controlling a driving motor of the vehicle, an inverter radiator for cooling the inverter, a heater core and the condenser, and
the heated fluid is an inverter coolant.

15. The exhaust heat recovery apparatus according to claim 9, wherein
the heated fluid circuit is an inverter radiator circuit through which connects an inverter for controlling a driving motor of the vehicle, an inverter radiator for cooling the inverter, a heating member and the condenser,
the heating member is capable of heating a battery that supplies the engine with electric power, and
the heated fluid is an inverter coolant.

16. The exhaust heat recovery apparatus according to claim 9, wherein,
the fin includes a single piece fin connecting adjacent tubes,
the single piece fin is bonded to the adjacent tubes, and
the single piece fin is bent defining the convex part.

* * * * *